US008243879B2

(12) United States Patent
Itoh et al.

(10) Patent No.: US 8,243,879 B2
(45) Date of Patent: Aug. 14, 2012

(54) SOURCE GRATING FOR X-RAYS, IMAGING APPARATUS FOR X-RAY PHASE CONTRAST IMAGE AND X-RAY COMPUTED TOMOGRAPHY SYSTEM

(75) Inventors: Hidenosuke Itoh, Tokyo (JP); Yoshikatsu Ichimura, Tokyo (JP); Takashi Nakamura, Yokohama (JP); Aya Imada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 12/594,243

(22) PCT Filed: Apr. 13, 2009

(86) PCT No.: PCT/JP2009/057807

§ 371 (c)(1),
(2), (4) Date: Oct. 1, 2009

(87) PCT Pub. No.: WO2009/128550

PCT Pub. Date: Oct. 22, 2009

(65) Prior Publication Data

US 2010/0246764 A1 Sep. 30, 2010

(30) Foreign Application Priority Data

Apr. 15, 2008 (JP) ................................ 2008-105355

(51) Int. Cl.

| | |
|---|---|
| ***G21K 1/06*** | (2006.01) |
| ***G21K 1/10*** | (2006.01) |
| ***G01T 1/36*** | (2006.01) |
| ***G02B 26/06*** | (2006.01) |
| ***G02F 1/017*** | (2006.01) |

(52) U.S. Cl. ............. 378/85; 378/82; 378/84; 359/238; 359/279

(58) Field of Classification Search .................... 378/70, 378/82–85, 210; 359/11, 238, 279, 300; 385/3
See application file for complete search history.

(56) References Cited

U.S. PATENT DOCUMENTS

| | | | | |
|---|---|---|---|---|
| 4,327,966 | A | 5/1982 | Bloom | 359/569 |
| 5,812,629 | A | 9/1998 | Clauser | 378/62 |
| 6,175,615 | B1 | 1/2001 | Guru et al. | 378/149 |
| 2007/0183560 | A1 | 8/2007 | Popescu et al. | 378/5 |
| 2007/0183579 | A1 | 8/2007 | Baumann et al. | 378/145 |
| 2007/0183582 | A1 | 8/2007 | Baumann et al. | 378/145 |
| 2008/0037709 | A1 * | 2/2008 | Yatsenko | 378/145 |

OTHER PUBLICATIONS

F. Feiffer et al., "Phase Retrieval and Differntial Phase-Contrast Imaging with Low-Brilliance X-Ray Sources", *Nature Physics*, vol. 2, Apr. 2006.

(Continued)

*Primary Examiner* — Anastasia Midkiff

(74) *Attorney, Agent, or Firm* — Fitzpatrick, Cella, Harper & Scinto

(57) ABSTRACT

A source grating for X-rays and the like which can enhance spatial coherence and is used for X-ray phase contrast imaging is provided. The source grating for X-rays is disposed between an X-ray source and a test object and is used for X-ray phase contrast imaging. The source grating for X-rays includes a plurality of sub-gratings formed by periodically arranging projection parts each having a thickness shielding an X-ray at constant intervals. The plurality of sub-gratings are stacked in layers by being shifted.

11 Claims, 5 Drawing Sheets

OTHER PUBLICATIONS

G. Grünzweig et al., "Design, Fabrication, and Characterization of Diffraction Gratings for Neutron Phase Contrast Imaging", *Review of Scientific Instruments* 79, May 2008.

K. Patorski, "Production of Binary Amplitude Gratings with Arbitrary Opening Ratio and Variable Period", *Optics and Laser Technology*, Oct. 1980.

* cited by examiner

SOURCE GRATING FOR X-RAYS, IMAGING APPARATUS FOR X-RAY PHASE CONTRAST IMAGE AND X-RAY COMPUTED TOMOGRAPHY SYSTEM

RELATED APPLICATIONS

The present application is a National Stage Entry of PCT/JP2009/057807, filed on Apr. 13, 2009, and claims priority benefit under 35 U.S.C. §119 of Japanese Patent Application No. 2008-105355, filed Apr. 15, 2008, which is hereby incorporated by reference herein in its entirety.

TECHNICAL FIELD

The present invention relates to a source grating for X-rays used for X-ray phase contrast imaging, an imaging apparatus for X-ray phase contrast image and an X-ray computed tomography system.

BACKGROUND ART

Since the 1990s, research on the phase contrast method using a phase difference of an X-ray beam has been conducted mainly in synchrotron radiation facilities.

Further, research on phase contrast imaging using X-ray tubes in laboratories has also been conducted, and a propagation method, the Talbot interference method, which will be described below, can be performed in principle.

In one propagation method a subject is irradiated with an X-ray beam generated by a micro-focus X-ray source, and the X-rays refracted in the test object are detected by a detector which is at a sufficient distance from the test object. With this method, an image can be acquired, which that is clearer and easier to see by enhancing the outline of a conventional absorption contrast image, but it is difficult to image soft tissue inside a test object.

Meanwhile, the Talbot interference method is a method for retrieving a phase image from an interference pattern which is expressed under certain interference conditions by using a transmission-type diffraction grating as described in U.S. Pat. No. 5,812,629.

For imaging by the Talbot interference method, an X-ray source which is spatially coherent, a phase grating for periodically modulating the phase of X-rays and a detector are, at least, required.

In order to have sufficient spatial coherence, it is necessary that $\lambda\times(R/s)$ satisfies the condition of being sufficiently large with respect to the pitch d of the phase grating.

Here, $\lambda$ represents the wavelength of the X-rays, R represents the distance between the X-ray source and the phase grating, and s represents the size of the source. In the description, the "pitch" of the phase grating is the period at which the gratings are arranged.

This may be a distance C between the center portions between a certain grating and the grating adjacent to it, or may be a distance C' between end surfaces of these gratings, as shown in a schematic view of the phase grating of FIG. 8.

In Talbot interference, an interference pattern reflecting the shape of the phase grating appears at a specific distance from the phase grating. This is called a "self-image".

The position where the self-image appears is $(d^2/\lambda\times n$ or $(d^2/\lambda)\times(l/m)$ from the phase grating, and this position is called a Talbot position. In this case, n and m are integers.

Here, if a test object is disposed in front of the phase grating, the X-rays which are irradiated are refracted by the test object. If the self-image of the phase grating by the X-rays transmitted through the test object is detected, the phase image of the test object can be obtained.

However, in order to detect the self-image which occurs with sufficient contrast, an X-ray image detector with high spatial resolution is necessary, and therefore, imaging is performed by using an absorption grating, which is a diffraction grating made of a material absorbing X-rays and having a sufficient thickness.

That is to say, if the absorption grating is disposed at a Talbot position, which is the position where the X-rays transmitted through the phase grating form a self-image, the phase shift can be detected as deformation of moiré fringes, and therefore, if the moiré fringes are detected with an X-ray image detector, the test object can be imaged.

Incidentally, in Talbot interference, in order to satisfy the coherence condition, synchrotron radiation with high coherency, and a micro-focus X-ray tube having a source with a micro focal spot size, are used.

However, synchrotron radiation has a problem from a practical point of view. A micro-focus X-ray tube, although it can be used in a laboratory system, has a small focal spot size and, therefore, has small brilliance. Therefore, the micro-focus X-ray tube has a problem of being incapable of obtaining a sufficient brilliance depending on the purpose of imaging.

From these reasons, "Phase Retrieval and Differential Phase-Contrast Imaging with Low-Brilliance X-Ray Sources", F. Pfeiffer et al., April 2006/Vol. 2/NATURE PHYSICS proposes an X-ray Talbot-Lau-type interferometer in which a source grating is disposed directly behind an X-ray source and Talbot interference is observed by using a normal X-ray tube.

Here, the term "source grating" means a diffraction grating having a periodical structure in one direction or two directions, and is configured by a region which transmits X-rays and a region which shields X-rays.

Further, it is necessary that the Talbot-Lau-type interferometer satisfies the following condition:

$$g=G\cdot l/L$$

where g represents the pitch of the absorption grating for X-rays, G represents the pitch of the source grating for X-rays, l represents the distance between the phase grating for X-rays and the absorption grating for X-rays, and L represents the distance between the source grating for X-rays and the phase grating for X-rays.

According to the X-ray Talbot-Lau-type interferometer as above, Talbot interference can be observed even with use of a normal X-ray tube with low coherency.

DISCLOSURE OF THE INVENTION

The spatial coherence $\lambda\times(R/s)$ of the X-rays which causes blurring of the image in the Talbot interferometer needs to satisfy the condition of being sufficiently large with respect to the pitch d of the phase grating for X-rays.

Therefore, in order to increase spatial coherence, the size (s) of the X-ray source needs to be small.

The size (s) of the X-ray source corresponds to the aperture width of the source grating, and therefore, the aperture width of the source grating is preferably small.

The aperture width of the source grating in the description indicates the interval between projection parts shown by A' in the above described FIG. 8.

Further, the width of the projection part is shown by A in the above described FIG. 8.

Meanwhile, the source grating needs to have a constant thickness for shielding X-rays. The thickness (height) of the projection part in the description indicates the thickness (height) shown by B in FIG. 8.

Therefore, when a source grating having a small aperture width is to be produced, the aspect ratio (height of the projection part/aperture width of the source grating) becomes large, and it becomes difficult to make such a source grating. Therefore, in the source grating for X-rays of "Phase Retrieval and Differential Phase-Contrast Imaging with Low-Brilliance X-Ray Sources", F. Pfeiffer et al., April 2006/Vol. 2/NATURE PHYSICS, the X-ray transmitting region becomes large due to limitation in the production process, spatial coherence reduces, and blurring may occur in the phase contrast image.

Especially in order to realize imaging with high contrast using a high-energy X-ray beam for medical use, that is, an X-ray beam with a long wavelength, sufficient spatial coherence is not always obtained in the source grating for X-rays of the cited F. Pfeiffer et al. article, and further improvement is required.

The problem of reducing the spatial coherence due to the relation of the aspect ratio of the above is not limited to the Talbot interferometer. The problem is common to, for example, a propagation method, an X-ray microscope, a fluoroscope and the like.

In view of the above described problem, the present invention has an object to provide a source grating for X-rays which can enhance spatial coherence and is used for X-ray phase contrast imaging, an imaging apparatus for an X-ray phase contrast image and an X-ray computed tomography system.

Further features of the present invention will become apparent from the following description of exemplary embodiments with reference to the attached drawings.

According to the present invention, a source grating for X-rays that can enhance spatial coherence and is used for X-ray phase contrast imaging, an imaging apparatus for X-ray phase contrast image and an X-ray computed tomography system can be provided.

BEST MODE FOR CARRYING OUT THE INVENTION

Next, embodiments of the present invention will be described.

Embodiment 1

In embodiment 1, an X-ray source grating will be described. The X-ray source grating has a structure in which an aperture width which is a transmitting region of X-rays formed by an interval between projection parts is made narrower than the aperture width of each of sub-gratings by stacking the line-shaped sub-gratings of two layers by shifting the line-shaped sub-gratings of two layers in a periodic direction with respect to the incident X-rays.

Here, the sub-grating means a diffraction grating of one layer part which is made by arranging projection parts periodically at constant intervals in the source grating for X-rays configured by being stacked in layers.

Further, the line-shaped sub-grating indicates the diffraction grating structure of the one layer part in which the linear projecting structures (projection parts) parallel with each other are periodically arranged.

Figure 1A:
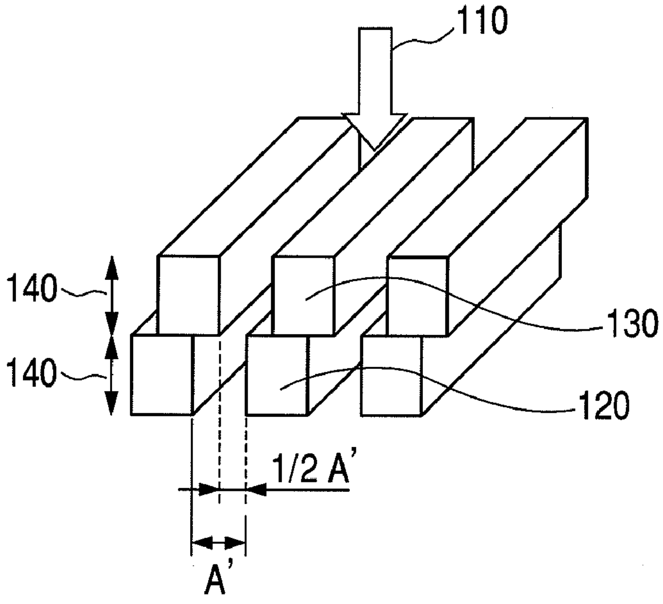
FIGS. 1A and 1B are views illustrating a configuration example and X-ray transmitting regions of the one-dimensional source grating for X-rays described in embodiment 1.

FIG. 1A illustrates a configuration example of the present embodiment.

In the present embodiment, the aforementioned projection part in the aforementioned line-shaped sub-grating has a "width" in the direction perpendicular to the direction in which X-rays transmit, and a "thickness" in the same direction as the direction in which the X-rays transmit. The thickness is formed to be a thickness 140 which shields the aforementioned X-rays which transmit.

When the above-described line-shaped diffraction gratings of the two layers are stacked, the sub-grating of the second layer (second sub-grating 130) is stacked by being shifted in the periodic direction of the sub-grating of the first layer (first sub-grating 120) with respect to an incident X-ray 110.

Figure 1B:
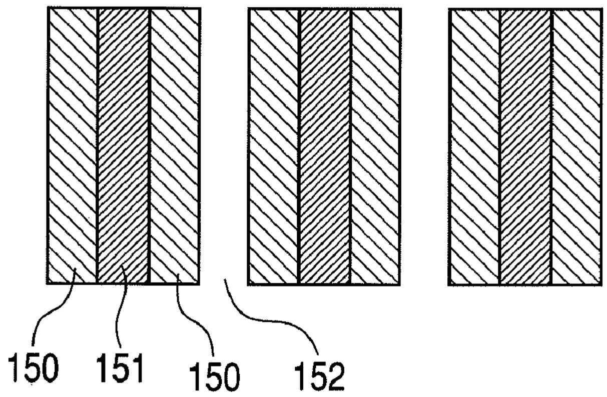

FIG. 1B is a view illustrating the area through which the X-rays are transmitted. A region 150 is shielded by the first sub-grating 120 and the second sub-grating layer 130, and a region 151 is shielded by both the first sub-grating 120 and the second sub-grating 130. The X-rays are transmitted through a region 152. By stacking the line-shaped sub-gratings of the two layers by shifting these sub-gratings in the periodic direction in this way, the aperture width which is a transmitting region of X-rays can be made narrow as the entire grating. From above-described way, in the source grating for X-rays which is obtained by stacking the line-shaped sub-gratings formed by the regions shielding X-rays and the regions partially transmitting the X-rays in multiple layers, the aperture width can be made narrower than those of the individual sub-gratings.

For example, in the structure illustrated in FIG. 1A, the aperture width is reduced to half the aperture width of each of the sub-gratings by stacking and shifting the line-shaped sub-grating 130 in the periodic direction of the line-shaped sub-grating 120 of the first layer.

Each of the sub-gratings configuring the source grating for X-rays is made by, for example, applying gold-plating to, or filling nano-paste of gold into a recessed and projecting line-shaped structure formed on the surface of a substrate or inside of a substrate.

Figure 2A:
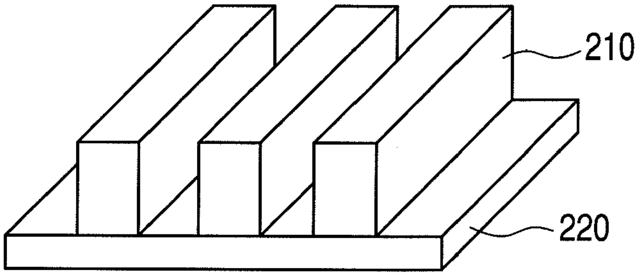
FIGS. 2A, 2B and 2C are configuration examples of the one-dimensional source grating for X-rays described in embodiment 1.

In this regard, a sub-grating 210 may be configured by a material differing from the material of a substrate 220 as shown in, for example, FIG. 2A. Further, as shown in FIG. 2B, a sub-grating 230 may be configured by fabricating the substrate itself.

Figure 2B:
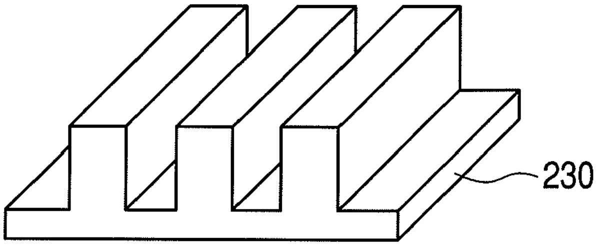

Further, the sub-grating 230 shown in FIG. 2B is of a non-penetrating structure, but this may be configured to be penetrated. If it is penetrated, there is no absorption of X-rays, and therefore, the use efficiency of the X-rays is enhanced.

Figure 2C:
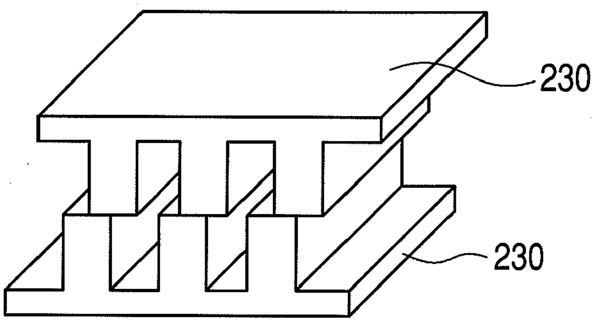

In order to obtain multi-layered diffraction grating, more than two sub-gratings are stacked in layers as shown in FIG. 2C (the sub-gratings 230 are stacked in layers here).

For stacking, the sub-gratings can be stacked to be in contact with each other, but the projection parts of both the sub-gratings may be configured not to be in contact with each other. In this regard, the substrates can be held to be parallel to each other.

For the substrate 220, a material which absorbs less X-rays at the time of irradiation of the X-rays can be used. For the shape of the substrate 220, a thin plate shape can be adopted. Further, favorable contrast is obtained if the front and back of the substrate 220 have mirror surfaces. As the material, a wafer such as Si, GaAs, Ge and InP, a glass substrate and the like can be used. A resin substrate of polycarbonate (PC), polyimide (PI), or polymethyl methacrylate (PMMA) can be used.

In order to form the sub-gratings, photolithography, a dry etching method, various depositing methods such as sputtering, vapor deposition, CVD, electroless plating, and electroplating, and a nano-imprint method can be used.

Specifically, after a resist pattern is formed by photolithography, the substrate may be fabricated by dry etching or wet etching, or a sub-grating can be disposed on the substrate by a liftoff method. The substrate or the material deposited on the substrate may be fabricated by a nano-imprint method.

In order to fill gold in the recessed and projecting pattern formed on the substrate, electrolytic Au plating can be applied, or Au nano-paste may be supplied into the pattern.

Figure 3A:
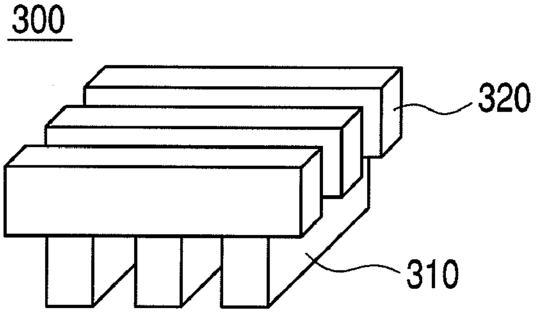
FIGS. 3A and 3B are configuration examples of the two-dimensional source grating for X-rays described in embodiment 1.

FIG. 3A illustrates a two-dimensional sub-grating 300. In the two-dimensional sub-grating 300, one line-shaped diffraction grating 320 is stacked on the other line-shaped diffraction grating 310 in the direction orthogonal to the periodic direction of the line-shaped diffraction grating 310.

Figure 3B:
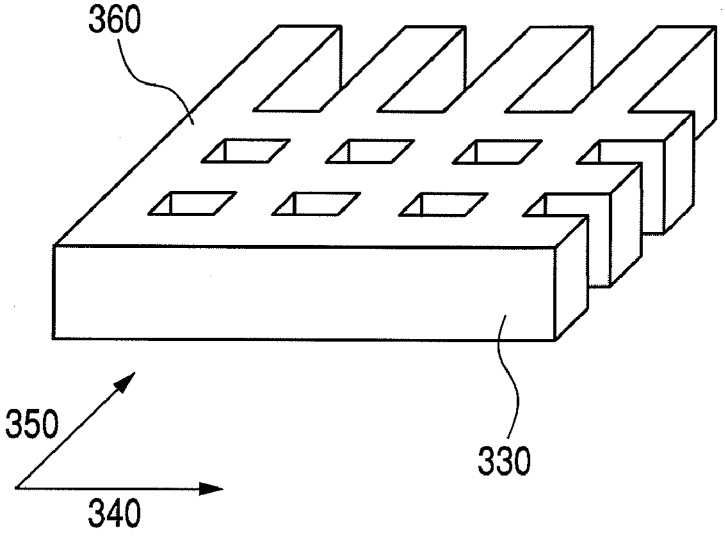

FIG. 3B illustrates a two-dimensional sub-grating 330 made without stacking structures. A sub-grating having rectangular apertures 360 which are two-dimensionally arranged in a first direction 340 and a second direction 350 orthogonal to the first direction 340 may be used like this.

Figure 4:
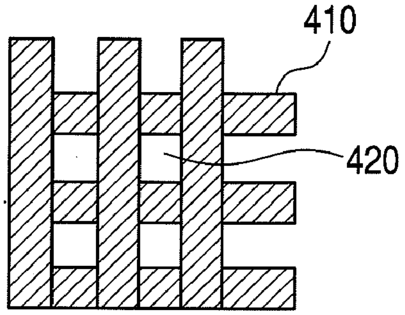
FIG. 4 is a view illustrating an intensity of the X-ray transmitting through the source grating for X-rays formed by line-shaped sub-gratings of two layers orthogonal to each other in embodiment 1.

FIG. 4 illustrates a region 420 through which X-rays are transmitted and a region 410 through which X-rays are not transmitted in the case of X-rays being incident on the sub-grating shown in FIG. 3A or 3B from the direction perpendicular to the sub-grating.

Figure 5:
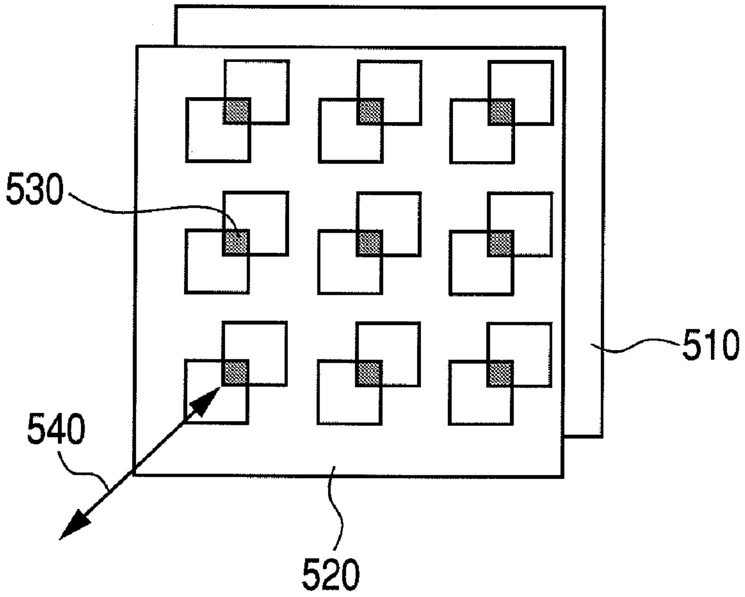
FIG. 5 is a configuration example of the two-dimensional source grating for X-rays in embodiment 1.

FIG. 5 illustrates a structure with two-dimensional sub-gratings 510 and 520 stacked in layers. When the two-dimensional sub-gratings are stacked in layers in this way, the multilayered two-dimensional sub-gratings are made by shifting the sub-gratings with respect to the longitudinal and lateral periodic directions (the first direction and the second direction). Specifically, the two-dimensional sub-grating 520 is stacked on the two-dimensional sub-grating 510 by being shifted in the direction 540.

Thereby, X-ray transmitting region 530, which is smaller than the apertures of each of the two-dimensional sub-gratings, is formed.

The source grating for X-rays according to the present embodiment is combined with a normal X-ray tube and detector, and can be used as a Talbot-Lau-type interferometer.

A phase grating for X-rays and an X-ray image detector with high spatial resolution may be used, and an absorption grating for X-rays may be further disposed between the phase grating for X-rays and the detector, and imaging may be performed behind moiré fringes formed using an image detector for X-rays.

Here, the term "phase grating for X-rays" means a diffraction grating for modulating the phase of X-rays that are transmitted through the source grating for X-rays. The term "absorption grating for X-rays" means a diffraction grating that is configured by a shield region which absorbs the X-rays transmitted through the phase grating and the X-ray transmitting region transmitting the X-rays.

Further, an X-ray phase contrast tomogram of a patient can be obtained by incorporating an imaging apparatus of an X-ray phase contrast image of the present embodiment into a gantry which is used in a conventional computed tomography system.

Embodiment 2

In embodiment 2, a configuration example of a variable X-ray transmitting region type source grating will be described. In the variable X-ray transmitting region type source grating, the width of an aperture that is an X-ray transmitting region is made variable by configuring at least one of the individual stacked sub-gratings to be movable.

Figure 7:
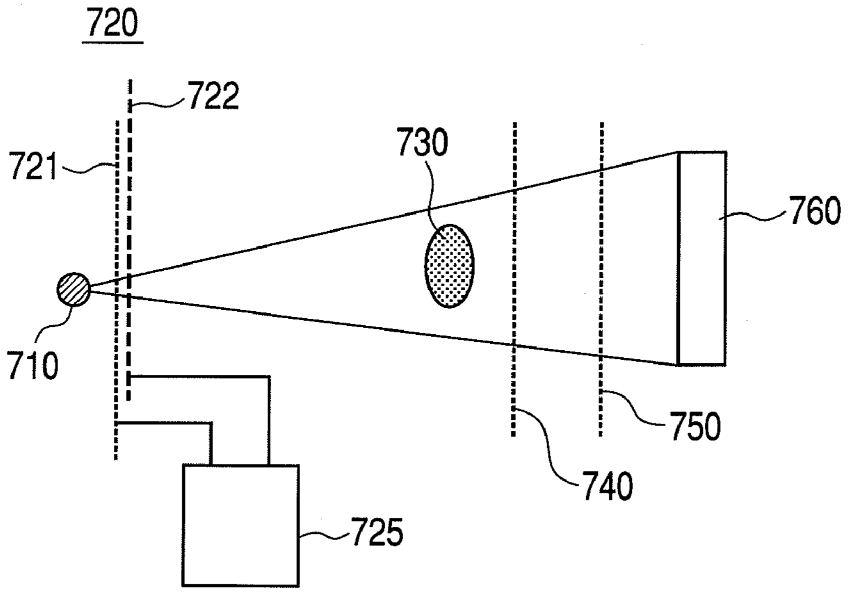
FIG. 7 is a view illustrating a Talbot interferometer in embodiment 2.
Figure 8:
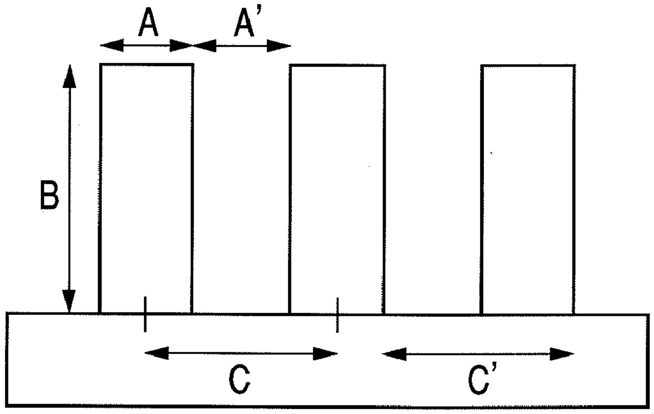
FIG. 8 is a schematic view for illustrating a pitch, a thickness (height) of a projection part, a width of the projection part and an aperture width in the phase grating used for X-ray phase contrast imaging.

FIG. 7 illustrates an X-ray imaging apparatus 720 having a movable unit which makes a sub-grating movable. A first sub-grating 721 and a second sub-grating 722 are provided between an X-ray source 710 and a test object 730. Further, a phase grating 740 and an absorption grating 750 are provided between the test object 730 and a detector 760.

At least one of the first sub-grating 721 and the second sub-grating 722 is made movable by a movable unit 725, and thereby, the X-ray transmitting region is made variable.

For example, in the one-dimensional source grating for X-rays in embodiment 1, at least one of the line-shaped sub-gratings stacked on each other is moved in the periodic direction, and thereby, the X-ray transmitting region is made variable.

Further, in the two-dimensional source grating for X-rays stacked in layers shown in FIG. 5, at least one of the sub-gratings stacked on each other is moved in a diagonal line direction 540, and thereby the X-ray transmitting region is made variable.

By such a configuration, spatial coherence and the X-ray flux due to the source size can be regulated to be the optimal values.

Specifically, when the X-ray transmitting region of the source grating is made small, the spatial coherence is enhanced, and the contrast of the phase contrast image can be enhanced, but when the X-ray transmitting region is made too small, the X-ray flux is reduced, which results in the reduction of the detection sensitivity.

With respect to this, the X-ray transmitting region is configured to be adjustable by moving at least one of the sub-gratings stacked in layers as in the above-described configuration of the present embodiment, whereby the spatial coherence and the X-ray flux due to the source size can be regulated to be the optimal values. Thereby, a high-contrast image can be imaged with the minimum required flux of X-rays.

In the present embodiment, as the movable unit 725, a microactuator movable in μm units in the two axial directions of the longitudinal and lateral directions may be used, or a stepping motor may be used.

For adjustment of the X-ray transmitting region, an alignment mark provided on the substrate may be used, or the X-ray transmitting region is adjusted as X-rays are irradiated and the X-ray intensity is measured with an ion chamber or an X-ray image detector.

In this regard, an adjustment method of an X-ray flux and image contrast, which uses, for example, the source grating for X-rays, the phase grating 740, the absorption grating 750 and the detector 760 in the present embodiment and includes the following steps, can be configured:

(1) Step of irradiating X-rays from an X-ray source toward the source grating for X-rays;

(2) Step of transmitting only part of the aforementioned X-rays by the aforementioned source grating for X-rays and irradiating the aforementioned phase grating 740 for X-rays with only the part of the X-rays;

(3) Step of irradiating the aforementioned absorption grating 750 for X-rays with an X-rays which generate the Talbot effect by being diffracted by the phase grating 740 for X-rays which is irradiated with the part of the aforementioned X-rays;

(4) Step of generating moiré fringes by rotating the aforementioned absorption grating 750 for X-rays on the grating surface;

(5) Step of detecting the moiré fringes by using the X-ray image detector 760 and forming an image by the moiré fringes; and (6) Step of optimizing the X-ray flux being transmitted through the transmitting region and contrast of the moiré fringes by adjusting the width of the aperture that is the transmitting region of X-rays, by moving the sub-gratings stacked in layers and configured to be movable, while observing the image by the aforementioned moiré fringes.

Further, in the present embodiment, while the self-image which is obtained by the Talbot effect by irradiating the target with X-rays is observed with the X-ray image detector, the X-ray transmitting region is adjusted so as to eliminate blurring of the image as much as possible, and the sub-gratings are adjusted, after which, the sub-gratings may be fixed and the X-ray phase contrast image may be directly observed. Alternatively, the sub-gratings may be readjusted during observation.

As in embodiment 1, the X-ray phase contrast tomogram of a patient can be obtained by incorporating an imaging apparatus of an X-ray phase contrast image of the present invention into a gantry used in a conventional computed tomography system.

Embodiment 3

In embodiment 3, a configuration example of a source grating will be described. In the source grating, three or more sub-gratings are stacked in layers by shifting the sub-gratings with respect to the sub-gratings in the lower layers in their periodic direction.

Figure 6:
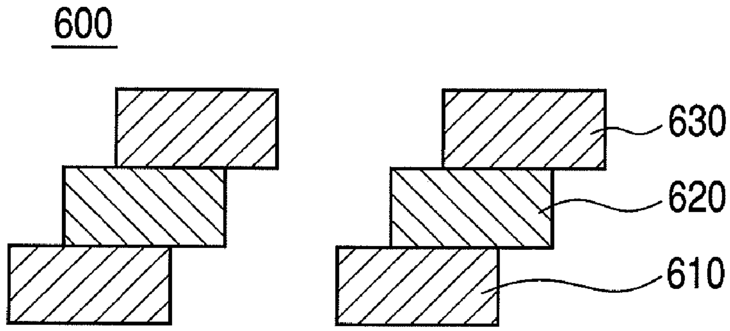
FIG. 6 is the source grating for X-rays formed by sub-gratings of three layers in embodiment 3.

FIG. 6 illustrates a sectional structure of a source grating 600 for X-rays of a three-layer configuration formed by sub-gratings 610, 620 and 630. By staking three or more sub-gratings in layers, the regions for transmitting X-rays can be made narrower as compared with the configuration of two layers.

EXAMPLES

Hereinafter, examples of the present invention will be described.

Example 1

In example 1, a one-dimensional source grating for X-rays will be described. The one-dimensional source grating for X-rays is formed by stacking line-shaped sub-gratings of two layers by shifting the line-shaped sub-gratings to each other and is used for X-ray phase contrast imaging.

After resist coating is applied onto the surface of a double-sided polished silicon wafer with a diameter of four inches and a thickness of 200 μm, a resist pattern with a line width of 30 μm and a gap of 50 μm is produced on an area of 60 mm square by photolithography.

Next, the following machining is performed by deep reactive ion etching. Specifically, after a slit structure of a line width of 30 μm, a gap of 50 μm and a depth of 40 μm is produced, the resist is removed.

A sputtered film of titanium-gold is formed on the substrate, and is used as a seed layer for electroplating, and plating is performed. After the gold attached on the substrate surface is removed, the sub-grating having the periodic structure in which the X-ray transmitting regions each having an aperture width of 30 μm are arranged at intervals of 50 μm is provided.

Next, two sub-gratings thus produced are bonded to each other using an epoxy resin or the like by shifting the sub-gratings in the periodic direction by half the aperture width of the sub-grating with the periodic structures which the sub-gratings have being aligned in the same direction so that the grating surfaces are oriented to be parallel with each other.

The phase grating for X-rays in which a slit structure of a line width of 2 μm, a gap of 2 μm and a depth of 29 μm is formed in the silicon wafer is used. The absorption grating for X-rays in which a slit structure of a line width of 2 μm, a gap of 2 μm and a depth of 29 μm, is formed on a silicon wafer, and gold is further filled into the gap portions by gold plating, is used.

When an experiment is performed with X-ray energy of 17.7 keV (0.7 angstrom), the Talbot distance is $3d^2/2\lambda=343$ mm for the third Talbot condition, for example.

When the phase grating for X-rays and the absorption grating for X-rays are both one dimensional diffraction gratings, the absorption grating for X-rays is shifted in the periodic direction of the one-dimensional diffraction grating by ⅕ of the pitch width of the diffraction grating, and an image is acquired by a CCD detector for X-rays.

The differential phase contrast image obtained in this way can be converted into a phase retrieval image by being integrated in the periodic direction of the one-dimensional diffraction grating.

Example 2

In example 2, a configuration example of a variable X-ray transmitting region type source grating will be described.

In the present embodiment, four one-dimensional sub-gratings are produced by the same method as in example 1. However, circular resist patterns of 10 μmϕ are produced at four corners of the area of 60 mm square.

Using the circular patterns, two one-dimensional sub-gratings are bonded to each other by using an epoxy resin or the like so that the periodic directions that the sub-gratings have are orthogonal to each other.

By producing two sets of the above, one obtains two two-dimensional sub-gratings.

Next, two of the two-dimensional sub-gratings are mounted on a stage loaded with a high-precision stepping motor one by one so that the periodic structures of the sub-gratings are sufficiently overlaid on each other and the X-ray transmitting region becomes the maximum. The same X-ray phase grating and X-ray absorption grating as those of example 1 are used.

A stage equipped with a high-precision stepping motor which operates in at least two axial directions that are longitudinal and lateral directions of the sub-grating surface is used.

Two of the two-dimensional sub-gratings are disposed so as not to interfere with each other physically and to be as close to each other as possible. Any one of the two-dimensional sub-gratings is moved by the stepping motor by 2 μm in each of the longitudinal and lateral directions, that is, 2.8 μm in the direction at 45°.

While the X-ray intensity is monitored with an ion chamber and the flux is measured, blurring of the Talbot image is reduced as much as possible with a CCD detector for X-rays.

The scope of the following claims is to be accorded the broadest interpretation so as to encompass all such modifications and equivalent structures and functions.

The invention claimed is:

1. An imaging apparatus for X-ray phase contrast imaging, comprising:

a source grating disposed between an X-ray source and a test object position;

a phase grating modulating a phase of X-rays being transmitted through said source grating to form an interference pattern by Talbot interference;

an absorption grating disposed at a position where the interference pattern is formed; and an X-ray image detector that detects X-rays transmitted through said absorption grating, wherein said source grating comprises a plurality of sub-gratings and a movable unit wherein the sub-gratings are formed by periodically arranging parts for shielding the X-rays which have a thickness for shielding X-rays at constant intervals, said plurality of sub-gratings are stacked in layers, and said movable unit is configured to move at least one of said sub-gratings to make a width of an aperture of said stacked sub-gratings, which aperture being an X-ray transmitting region, variable.

2. The imaging apparatus for X-rays according to claim 1, wherein said plurality of sub-gratings comprise line-shaped first and second sub-gratings in which said parts for shielding the X-rays are linearly formed and periodically arranged at constant intervals, and said second sub-grating is stacked by being shifted with respect to the periodic direction of said first sub-grating.

3. An imaging apparatus for X-ray phase contrast imaging, comprising:

a source grating disposed between an X-ray source and a test object position;

a phase grating modulating a phase of X-rays being transmitted through said source grating to form an interference pattern by Talbot interference; and an X-ray image detector that detects X-rays transmitted through said absorption grating, wherein said source grating comprises a plurality of sub-gratings, said plurality of sub-gratings comprise first and second line-shaped sub-gratings in which said parts for shielding the X-rays are linearly formed and periodically arranged at constant intervals, said first and second line-shaped sub-gratings being stacked in a manner that a periodic direction of said second line-shaped sub-grating is orthogonal to a periodic direction of said first line-shaped sub-grating, and said plurality of sub-gratings are stacked in layers in a manner that the periodic directions of the first and the second line-shaped sub-gratings are aligned between the stacked sub-gratings while by being shifted relative to one another to form an aperture of said sub-gratings stacked in layers, which is an X-ray transmitting region.

4. The imaging apparatus for X-rays according to claim 1, wherein said source grating comprises first and second sub-gratings having rectangular apertures which are two-dimensionally arranged in a first direction and a second direction orthogonal to the first direction, and said movable unit moves at least one of said plurality of sub-gratings in a direction of a diagonal line between the first direction and the second direction.

5. The imaging apparatus for X-rays according to claim 1, wherein said source grating comprises three or more sub-gratings.

6. The imaging apparatus for X-rays according to claim 3, wherein said source further comprises a movable unit, and said movable unit is configured to move at least one of the sub-gratings in a direction of a diagonal line between the periodic direction of said first and second line-shaped sub-gratings, to make a width of an aperture of said sub-gratings stacked in layers, which is an X-ray transmitting region, variable.

7. The imaging apparatus for X-rays according to claim 3, further comprising an absorption grating including a shield region that absorbs X-rays being transmitted through said phase grating and an X-ray transmitting region that transmits the X-rays.

8. The imaging apparatus for X-rays according to claim 1, wherein said parts for shielding the X-rays of each of said sub-gratings are stacked to form a shielding region shielded by said source grating.

9. The imaging apparatus for X-rays according to claim 1, wherein said movable unit moves at least one of said sub-gratings while said parts for shielding the X-rays of each of said sub-gratings remain stacked.

10. The imaging apparatus for X-rays according to claim 1, wherein said movable unit moves at least one of said sub-gratings while a pitch of said source grating remains unchanged.

11. An imaging apparatus for X-ray phase contrast imaging, comprising:

a source grating disposed between an X-ray source and a test object position;

a phase grating modulating a phase of X-rays being transmitted through said source grating to form an interference pattern by Talbot interference; and an X-ray image detector that detects an interference pattern of the X-rays, wherein said source grating comprises a plurality of sub-gratings and a movable unit, said sub-gratings are formed by periodically arranging parts for shielding the X-rays which have a thickness for shielding X-rays at constant intervals, said plurality of sub-gratings are stacked in layers, and said movable unit makes at least one of said sub-gratings stacked in layers movable, and makes the width of an aperture, which is an X-ray transmitting region of said source grating, variable.

* * * * *